(12) United States Patent
Deal (10) Patent No.: US 9,156,315 B2
(45) Date of Patent: Oct. 13, 2015

(54) TIRE USING A REINFORCING STRUCTURE WITH FIBRES OF FLATTENED CROSS SECTION

(75) Inventor: Michel Deal, St.-Remy-en-Rollat (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 485 days.

(21) Appl. No.: 12/681,646

(22) PCT Filed: Jul. 24, 2008

(86) PCT No.: PCT/FR2008/001105
§ 371 (c)(1),
(2), (4) Date: Jul. 7, 2010

(87) PCT Pub. No.: WO2009/044014
PCT Pub. Date: Apr. 9, 2009

(65) Prior Publication Data
US 2010/0282392 A1    Nov. 11, 2010

(30) Foreign Application Priority Data

Oct. 5, 2007  (FR) .................................... 07 07030

(51) Int. Cl.
*B60C 9/00* (2006.01)
*B60C 9/18* (2006.01)
*B60C 9/20* (2006.01)
*B60C 9/02* (2006.01)
*B60C 9/22* (2006.01)

(52) U.S. Cl.
CPC ................. *B60C 9/20* (2013.01); *B60C 9/0064* (2013.01); *B60C 9/023* (2013.01); *B60C 9/2204* (2013.04)

(58) Field of Classification Search
CPC .............. B60C 9/00; B60C 9/064; B60C 9/18
USPC ........................................................ 152/538
See application file for complete search history.

(56) References Cited

U.S. PATENT DOCUMENTS 3,643,723 A * 2/1972 Mukai et al. .................. 152/527
4,702,294 A * 10/1987 Kubica et al. ................. 152/556
(Continued)

FOREIGN PATENT DOCUMENTS

EP            350944      *  1/1990
EP          0 605 177        7/1994
(Continued)

OTHER PUBLICATIONS

Research Document 364010, Aug. 1994.*
(Continued)

*Primary Examiner* — Justin Fischer
(74) *Attorney, Agent, or Firm* — Cozen O'Connor (57) ABSTRACT

A tire comprising an airtight rubber cover (2) and a reinforcing structure essentially formed of a plurality of fibers (30, 40) embedded in the rubber and arranged in layers, this reinforcing structure comprising at least one carcass layer (3) and one crown layer (4). The fibers (30) and (40) of these layers (3, 4) are connected together and oriented, with respect to the median plane (P) of the tire, at respective angles of the order of 90 degrees and 0 degrees, each of these fibers (30, 40) also having a connected cross section of flattened shape.

30 Claims, 4 Drawing Sheets

(56) References Cited

U.S. PATENT DOCUMENTS

| | | | |
|---|---|---|---|
| 4,754,794 A | | 7/1988 | Bocquet et al. |
| 4,947,914 A | * | 8/1990 | Noma et al. .................. 152/531 |
| 5,240,772 A | * | 8/1993 | Henning ....................... 428/400 |
| 6,318,432 B1 | | 11/2001 | Caretta et al. |
| 6,520,232 B1 | | 2/2003 | Miyazaki et al. |

FOREIGN PATENT DOCUMENTS

| | | | |
|---|---|---|---|
| EP | 0 648 621 | | 4/1995 |
| EP | 1 167 081 | | 1/2002 |
| JP | 3-148308 | | 6/1991 |
| JP | 6-115309 | * | 4/1994 |
| JP | 07 172106 | | 7/1995 |
| JP | 10-58910 | | 3/1998 |
| JP | 10-226204 | * | 8/1998 |
| JP | 11-192810 | * | 7/1999 |
| JP | 2000-264013 | | 9/2000 |
| JP | 2001-30705 | | 2/2001 |
| JP | 2004-359039 | * | 12/2004 |
| JP | 2005-219512 | * | 8/2005 |
| JP | 2006-44487 | | 2/2006 |
| JP | 4191103 | | 9/2008 |
| JP | 2009-092261 | | 4/2009 |
| WO | WO2004/085173 | | 10/2004 |

OTHER PUBLICATIONS

Machine translation of JP 10-226204, 1998.*
Machine translation of JP 6-115309, 1994.*
Machine translation of JP 11-192810, 1999.*
Machine translation of JP 2005-219512, 2005.*
Machine tranlsation of JP 2004-359039, 2004.*

* cited by examiner

TIRE USING A REINFORCING STRUCTURE WITH FIBRES OF FLATTENED CROSS SECTION

RELATED APPLICATIONS

This is a U.S. national stage under 35 U.S.C. §371 of application No. PCT/FR2008/001105, filed on Jul. 24, 2008, and claims priority on French application No. 0707030, filed on Oct. 5, 2007, the content of which is hereby incorporated by reference.

BACKGROUND OF THE INVENTION

The invention relates in general to motor vehicle equipment.

More specifically, the invention relates to a tire comprising an airtight rubber cover and a reinforcing structure essentially formed of a plurality of fibres individually embedded in the rubber and arranged in several layers.

Present-day tire performance, particularly in terms of longevity, airtightness and strength, is nowadays obtained at the expense of high complexity, both in terms of the material structure of these tires and in terms of the steps and operations that have to be implemented in order to manufacture them.

SUMMARY OF THE INVENTION

One object of the invention is to provide a tire which, for the same performance, is structurally simpler and easier to manufacture than present-day tires.

This and other objects are attained in accordance with one aspect of the present invention directed to a tire comprising an airtight rubber cover and a reinforcing structure essentially formed of a plurality of fibres individually embedded in the rubber and arranged in several layers. The reinforcing structure is formed of a carcass layer, of a crown layer and of connecting means. Each fibre of the carcass layer makes a first angle of between 75 and 90 degrees with a median plane perpendicular to the axis of the tire. Each fibre of the crown layer makes a second angle of between 0 and 15 degrees with the median plane of the tire. The connecting means join together the fibres of the carcass layer and of the crown layer. At least some of the fibres of the reinforcing structure each have a completely connected cross section of flattened shape with first and second mutually orthogonal dimensions of which the first, or thickness, is less than the second dimension, or width, and runs in a substantially radial direction of the tire.

When the first angle is equal to 90 degrees, each fibre oriented at this angle is thus positioned in a meridian plane of the tire, that is to say in a plane passing through the axis of the tire.

It will be recalled that a completely connected surface is a surface in which any two parts are, of necessity, joined together.

By way of a contrasting example of a fibre with a completely connected cross section, mention may in particular be made of cords with several twisted strands, of the kind conventionally used in tire reinforcing structures, the cross section of a cord of this type being formed by the juxtaposition of the cross sections of the various strands of which this cord is made, each of which is independent of, and free in relation to, the other.

Further, the expression "radial direction" is defined here as encompassing any direction which is both inscribed in a meridian half-plane extending from the axis of the tire and which itself passes through the centre of the line, in this meridian half-plane, of the substantially toroidal internal volume delimited by the tire.

In other words, the thickness of each of the fibres of flattened cross section therefore extends in a direction substantially normal to the cover of the tire.

The invention in fact relies upon the discovery that, as a counterpart to their advantageous and universally recognized mechanical properties, the multi-strand cords used these days for making tire reinforcements can also encourage the onset of undesirable phenomena, the structural complexity of present-day tires being caused precisely by the need to reduce such phenomena.

In particular, multi-strand cords, the cross section of which is generally circular, have the property of presenting a significant resistance to the tensile forces applied by the internal pressure of the tire, and of bending very readily in order to allow deformations of the tire upon contact with the ground.

By contrast, if each cord were individually well embedded in the rubber of the tire, this rubber would not penetrate to the heart of the cord, such that none of the strands of this cord would be individually embedded in the rubber and the cross section of this cord would therefore not be completely connected.

What this means in particular is that the cord acts as a guide along which all the fluids which may reach it travel, these fluids notably being the air trapped in the tire and the moisture if this tire becomes damaged.

In addition, any bending of the cord has, of necessity, to be accompanied by a relative longitudinal movement between the strands of this cord, with the introduction of friction at the interfaces if there is contact between these strands, or by shearing of the rubber of the tire in the absence of contact, each of these parasitic phenomena being undesirable.

By ensuring that at least some of the fibres of the reinforcing structure have a completely connected and flattened cross section, the invention makes it possible both to reinforce the airtightness of the tire and to reduce the mechanical fatigue thereof.

The fibres of flattened cross section have, for example, in cross section, a width and a thickness of which the ratio of the first to the second is at least equal to five, it being possible in particular for this cross section to adopt a rectangular, oval or elliptical shape.

In one possible embodiment of the invention, at least some of the fibres of flattened cross section are each formed of a single filament.

However, it is also possible to ensure that at least some of the fibres of flattened cross section are each formed of a plurality of substantially mutually parallel filaments embedded in a matrix that gives this fibre its airtightness and cohesion.

In all cases, the fibres of flattened cross section are advantageously each made of a material (composite or otherwise) that has a tensile modulus of between 3 GPa and 250 GPa, each fibre of the crown layer having a tensile modulus of at least 30 GPa.

For preference, the fibres of flattened cross section of each layer have, within each layer, a non-zero mutual separation of less than 2 millimeters and, for example, of 1 millimeter at most.

The fibres of flattened cross section may be made from a material chosen from the group comprising steel, aluminium, glass, a polymer belonging to the family of polyester, polyethylene, polyamide, aramid or polyvinyl alcohol, a composite formed of filaments of glass or of such a polymer embedded in a resin, and particularly a composite of polyethylene filaments coated with resorcinol-formaldehyde-latex.

In one possible embodiment of the invention, the connecting means comprise a connecting layer positioned between the carcass layer and the crown layer and coupling these together.

For preference, the material of which the connecting layer is made has a secant tensile modulus at 10% deformation of at least 50 MPa.

In particular, the material of which this connecting layer is made may comprise polyester, an epoxy resin, or a material that has a secant tensile modulus at 10% deformation at least equal to the tensile modulus of polyester or of epoxy resin.

However, it may also be sensible to ensure that the material of which the connecting layer is made has a secant tensile modulus at 10% deformation at most equal to 300 MPa.

In another embodiment, the connecting means may at least comprise connecting points directly and individually connecting the fibres of flattened cross section belonging to the carcass layer to each fibre of flattened cross section belonging to the crown layer, the carcass layer and the crown layer thus together forming a grid structure.

When the fibres of flattened cross section belonging to the carcass and crown layers are made of a composite formed of filaments embedded in a primary and secondary resin, the connecting points are advantageously created by connecting the secondary resin of the fibres of the carcass layer with the secondary resin of the fibres of the crown layer.

In one embodiment that is easy to industrialize, the crown layer may be formed of a circumferential winding of a tape, the various turns of which constitute the various fibres of this layer.

The cohesion of the reinforcing structure is, for example, provided by, in particular, ensuring that each of the fibres of the carcass layer is folded round and held at its two ends on respective circular bead wires that reinforce the respective internal beads of the tire.

Moreover, the crown layer preferably extends around the carcass layer and in a restricted zone substantially parallel to the tread.

DETAILED DESCRIPTION OF THE DRAWINGS

As previously stated, the invention relates to a tire considered essentially from the point of view of its structure.

A tire 1 comprises, in the traditional way, an airtight rubber cover 2 and a reinforcing structure essentially formed of a plurality of fibres individually embedded in the rubber and arranged in several layers.

The rubber and the reinforcing structure together define beads 11 via which the tire is mounted on the rim, a tread 12 via which the tire presses against the road, and sidewalls 13.

The rubber 2, the composition of which is generally not consistent throughout the entire tire but rather may change to suit the various functions it is to perform at the various locations it occupies within the tire, is essentially made of rubber-based compounds incorporating various fillers or additives known to those skilled in the art.

In a tire according to the invention, the reinforcing structure is formed of a carcass layer 3, of a crown layer 4 and of connecting means 21.

The carcass layer 3 may typically extend both under the tread 12 and under the sidewalls 13 of the tire.

Each of the fibres 30 in the carcass layer 3 is, for example, held in position, by its two bent-over ends, on bead wires 5, for example of circular cross section, which respectively reinforce the right-hand and left-hand beads 11 of the tire.

The fibres 30 in this carcass layer 3 form, with the median plane P perpendicular to the axis X of the tire, a first angle A1 which is as close as possible to 90 degrees, and at least equal to 75 degrees.

Figure 1:
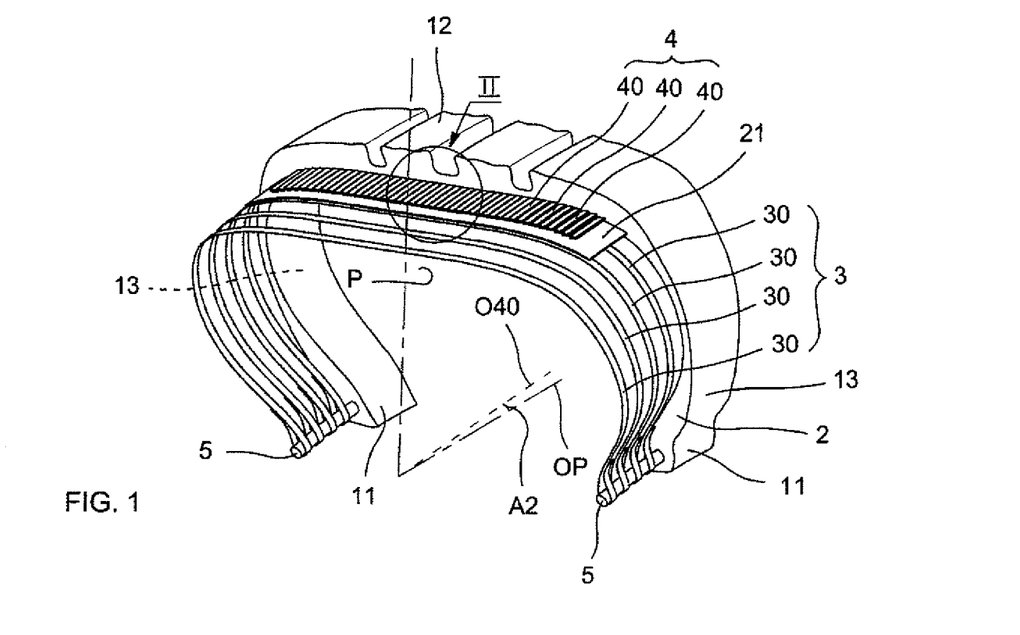
FIG. 1 is a perspective partial view with cutaway of a tire according to one embodiment of the invention, in which the connecting means comprise a connecting layer.
Figure 5:
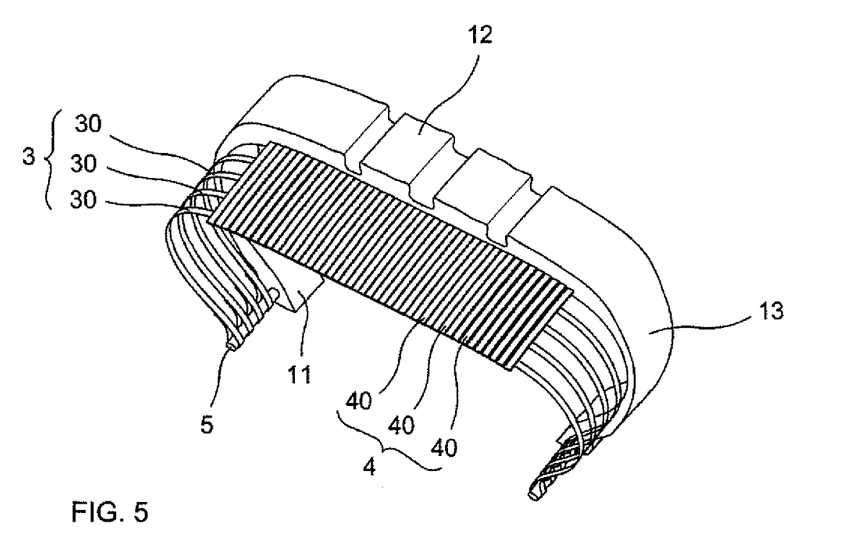
FIG. 5 is a perspective partial view with cutaway of a tire according to an embodiment of the invention in which the connecting means comprise connecting points directly joining the fibres of the carcass layer to the fibres of the crown layer.
Figure 6:
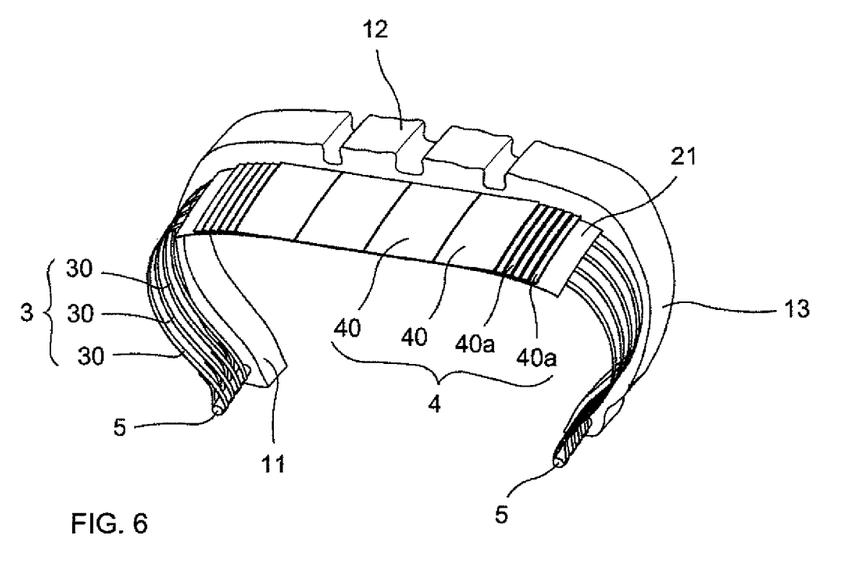
FIG. 6 is a perspective partial view with cutaway of a tire according to an embodiment of the invention in which the connecting means comprise a connecting layer and in which the crown layer comprises fibres of different widths and possibly of different types.

As FIGS. 1, 5 and 6 show, the crown layer 4 may for its part extend around the carcass layer 3, but preferably only in a restricted zone, under the tread 12, while remaining substantially parallel to this tread.

This crown layer may essentially consist of several fibres 40 as shown by FIGS. 1, 5 and 6 in particular.

However, this crown layer may also essentially consist of a single fibre 40 shaped as an annulus and occupying the entire width, or at least most of the width, of the crown layer 4, this single fibre thus constituting an annular band.

Each fibre 40 of the crown layer 4 forms, with the median plane P of the tire, a second angle A2 which is as close as possible to 0 degrees, and at most equal to 15 degrees.

This angle A2 is illustrated in FIG. 1 between a line OP of the median plane P on a plane perpendicular to this plane P and the orthogonal projection O40, onto this perpendicular plane, of the axis of symmetry of a fibre 40.

The connecting means, which may adopt various different embodiments, notably that of a connecting layer 21, have the function of joining together the fibres 30 and 40 of the carcass layer and of the crown layer 4 and in particular of fixing the relative angular position of the fibres 30 in relation to the fibre 40 or fibres 40.

Furthermore, the reinforcing structure consisting of the layers 3 and 4 comprises fibres each of which has a completely connected cross section of flattened shape.

In the remainder of the present description, it will be assumed that each of the layers 3 and 4 comprises several respective fibres 30 and 40, and that each of these fibres 30 and 40 has a completely connected cross section of flattened shape, this situation corresponding to the preferred embodiment while nonetheless remaining optional.

The connectedness of the cross section of each of the fibres 30 and 40 here defines the propensity of this cross section of taking the form of a single block or, more scientifically, of constituting a completely connected domain within the topological meaning of the term.

To achieve this, each of the fibres 30 and 40 may, for example, be formed of a single filament, particularly of a filament made of metal, a metal alloy, or a polymer.

Any two arbitrary parts of the cross section of the fibre therefore belong to one and the same mass made of one and the same material.

Nonetheless, each of these fibres 30 and 40 may also be formed of a plurality of metal, textile, glass or polymer filaments that are substantially mutually parallel, these filaments being embedded in a matrix the purpose of which is to give the fibre its airtightness and cohesion.

Any two arbitrary parts of the cross section of the fibre are therefore at least joined together by the matrix.

The flattened shape of the cross section of each of the fibres 30 and 40 is here defined by the fact that this cross section has two mutually orthogonal dimensions of which the first, termed the "thickness", is less than the second, termed the "width", the thickness extending in a substantially radial direction of the tire.

Figure 2:
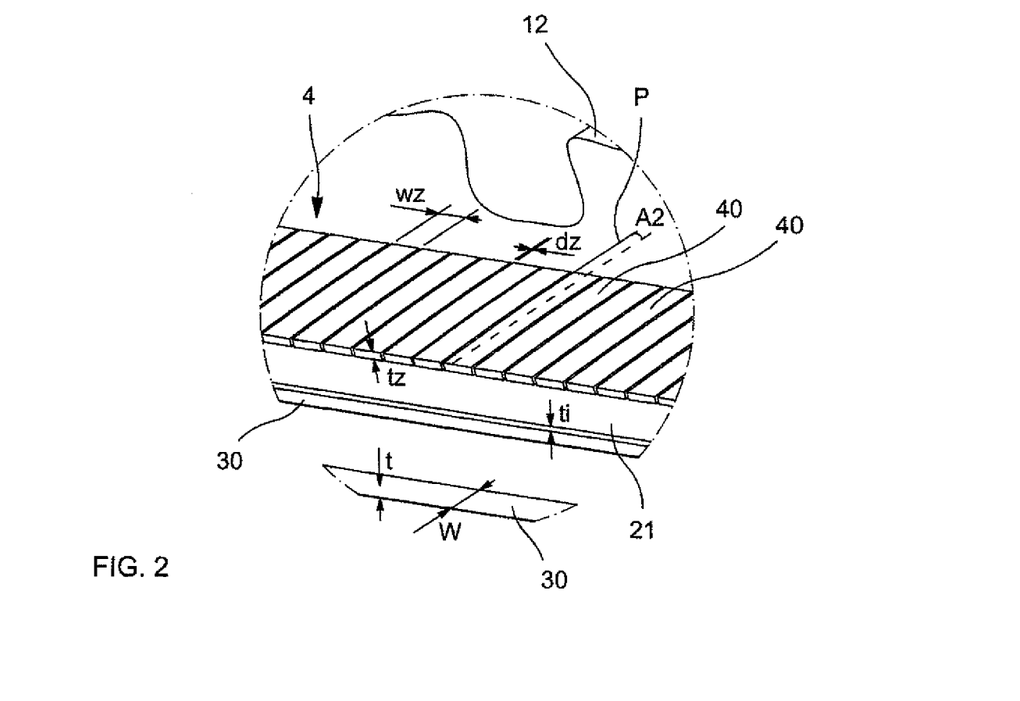
FIG. 2 is an enlarged view of detail II of FIG. 1.
Figure 3:
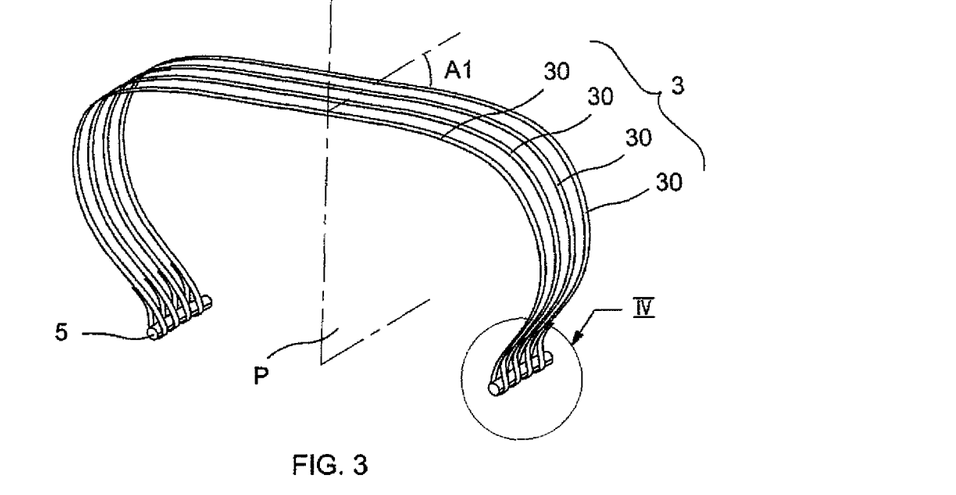
FIG. 3 separately illustrates a detail taken from FIG. 1.

Provided that it is flattened, the cross section of each of the fibres 30 and 40 may adopt any specific shape, and may notably be of rectangular (FIG. 2), oval or elliptical shape.

Figure 4:
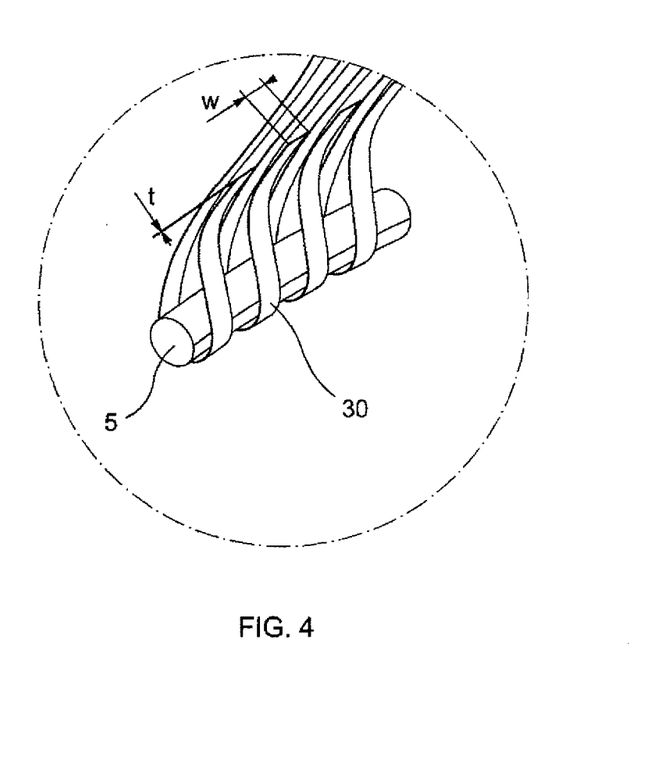
FIG. 4 is an enlarged view of detail IV of FIG. 3.

For example, the ratio w/t of the width w of the cross section of each fibre 30 (FIGS. 2 and 4) to the thickness t of this cross section may be equal to 5 or more, it being possible for the same range of values to be applied to the ratio wz/tz of the width wz of the cross section of each fibre 40 (FIG. 2) to the thickness tz of this cross section.

For preference, each of the fibres 30 and 40 is made of a material, composite or otherwise, that has a tensile modulus of between 3 GPa and 250 GPa, each fibre 40 of the crown layer having a tensile modulus at least equal to 30 GPa.

These fibres 30 and 40 may in particular be made of a material such as steel, aluminium, glass, a polymer belonging to the family of polyester, polyethylene, polyamide, aramid, or polyvinyl alcohol, or of a composite formed of filaments of glass or of such a polymer embedded in a resin.

In other words, each of the fibres 30 and 40 may be made of a single isotropic or orthotropic material (the latter being obtained for example by orienting the molecular chains of a textile extrusion or by drawing rolled steel), or may be made of a composite of filaments embedded in a matrix preventing any relative movement of the filaments other than the movement obtained by the shearing of the matrix.

In all events, the fibre, when viewed from the outside, constitutes an airtight lace.

Two examples of composites that may be used are, firstly, GPC (a composite of glass fibres and plastic resin) and secondly, filaments of polyethylene (PET) combined into a single fibre by coating them with resorcinol-formaldehyde-latex (RFL), that is to say by coating them with a primary and a secondary resin, the primary resin giving the filaments of the fibre their cohesion and the secondary resin, which is latex based, forming the connection between the primary resin and the rubber of the tire.

Furthermore, the adjacent fibres 30 of the layer 3 have a non-zero mutual separation of advantageously less than 2 millimeters and, for example, of 1 millimeter at most, it being possible for the same rule to be applied to the adjacent fibres 40 of the layer 4.

FIGS. 1 and 6 illustrate an embodiment in which the connecting means comprise a connecting layer 21, of thickness ti (FIG. 2), positioned between the carcass layer 3 and the crown layer 4 and coupling these layers 3 and 4 together.

This connecting layer 21 is preferably made of a material that has a secant tensile modulus at 10% deformation of at least 50 MPa, without, however, needing to exceed 300 MPa.

The material of which this connecting layer 21 is made may, for example, comprise polyester, an epoxy resin, or a material that has a secant tensile modulus at 10% deformation at least equal to the tensile modulus of polyester or of epoxy resin.

In another embodiment, illustrated in FIG. 5, the connecting means essentially or exclusively consist of connecting points directly and individually connecting the fibres 30 of the carcass layer 3 to the fibres 40 of the crown layer 4.

In this embodiment, the carcass layer 3 and the crown layer 4 therefore together form a grid structure.

When the fibres 30 and 40 of the respective layers 3 and 4 are made of a composite formed of filaments embedded in a primary resin, the connecting points may advantageously consist of secondary resin.

When these fibres 30 and 40 are made of a composite formed of filaments embedded in a primary and secondary resin, the connecting points may advantageously be formed by connecting the secondary resin of the fibres of the carcass layer with the secondary resin of the fibres of the crown layer.

In particular, when the fibres 30 and 40 are coated with resorcinol-formaldehyde-latex, a coupling agent such as isocyanate may be applied to the interior face of the fibres 40 in order to join together the secondary resins of the fibres 30 and 40.

When the fibres used are made of steel, these fibres may advantageously be brass-plated before being coated.

Figure 7:
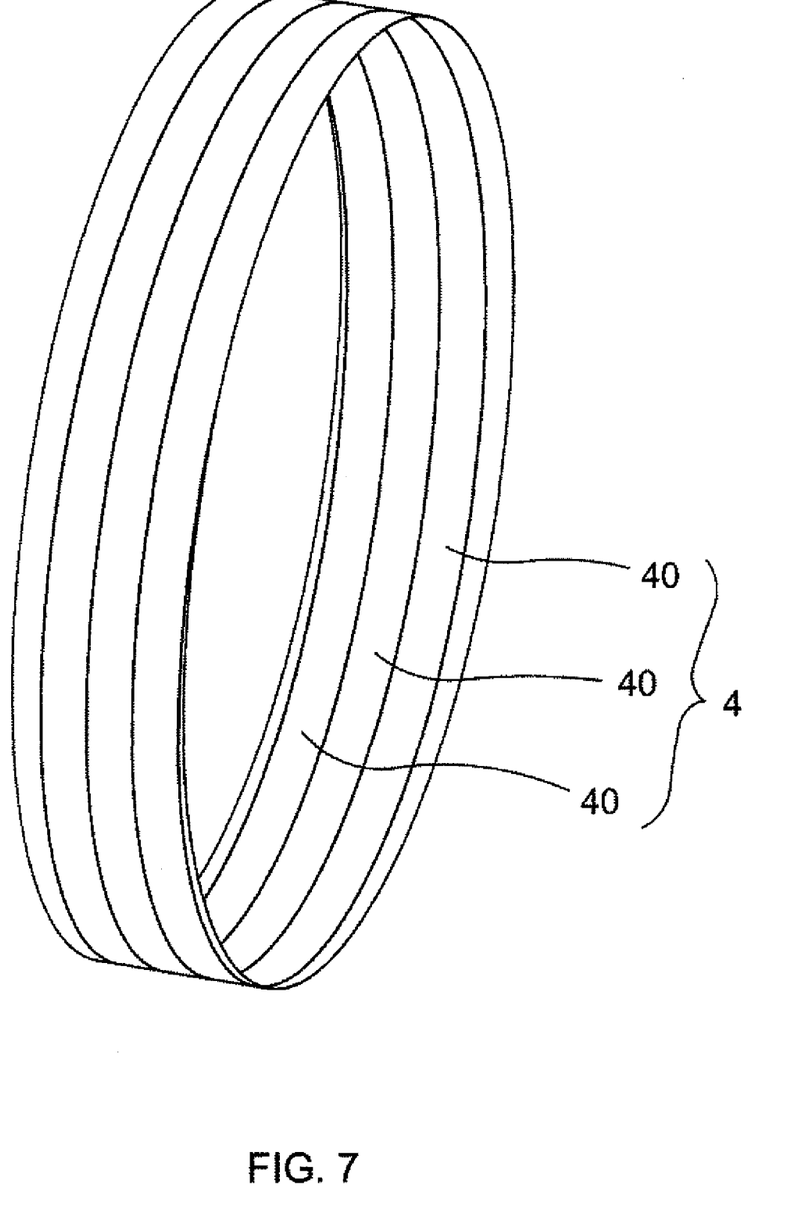
FIG. 7 is a perspective view of a crown layer for a tire according to the invention, this layer being produced by helically winding a tape cut at its edges.

Whatever the solution chosen for connecting the layers 3 and 4 together, the crown layer 4 may be formed, as shown by FIG. 7, by helically circumferentially winding a tape, the various turns of this tape then constituting the various fibres 40 of this layer 4.

In this case, the wider the tape used, the greater will be the angle A2 formed by the fibres 40 of the crown layer 4 with the median plane P of the tire.

In this case, it may be beneficial to cut the tape at an angle at the edges of the helical winding so that these edges lie inside respective planes parallel to the median plane P.

The dimensions w and t of each of the fibres 30 of the carcass layer 3, together with the pitch at which these fibres are laid, are dependent on numerous parameters associated with the architecture, materials and operation of the tire.

The greater the width w of the fibre 30, the less tendency this fibre will have to bend in the direction of the circumference of the tire, but the greater will be the ability of this tire to transmit torque.

All other factors being equal, the higher the maximum permissible stress and modulus of elasticity of the material of which this fibre is made, the lower will be the thickness t that can be chosen for it.

In one embodiment given by way of nonlimiting example, a passenger vehicle tire according to the invention, of dimensions 205/55 R16 may, for the fibres of the carcass layer 3, use a steel tape with a width w of 0.7 mm, a thickness t of 0.09 mm, and a breaking strength of 2800 MPa, these fibres being laid over the bead wires 5 at a laying pitch of 1 mm.

The dimensions wz and tz of each of the fibres 40 of the crown layer 4, and the laying pitch of these fibres, are themselves also dependent on numerous parameters associated with the architecture, the materials chosen, and the operation of the tire.

Although the design rules are, for the most part, common to those of the carcass layer and can be established by a person skilled in the art by adopting the reinforcing structure as described and illustrated, particular attention should be paid, in the case of the crown layer 4, to the distance dz separating two adjacent fibres 40.

For maximum rigidity, the adjacent fibres 40 may be in contact with one another in the central part of the crown, and this amounts to giving the parameter dz a zero value.

When the connecting means comprise a special-purpose rubber layer 21, the characteristics of this layer of rubber also play a part in the choice of the widths w and wz of the fibres 30 and 40 through the coupling of the layers 3 and 4, chiefly in terms of the modulus of this rubber and its thickness ti, which is constant around the circumference of the tire but may vary in one and the same meridian plane of this tire.

Specifically, the coupling of the layers 3 and 4 is mainly achieved by all the rectangular zones of dimensions w by wz where the rubber 21 is coupled both on one side to the layer 3 and on the other side to the layer 4.

In order to give the tire good rigidity in terms of sideslip, it is preferable to choose a smaller number of zones of large dimensions w and wz rather than a larger number of zones of small dimensions w and wz.

The sideslip rigidity can be obtained simply by increasing the width of the fibres 40 of the crown layer 4, for example up to 80 mm at the centre of the crown of the tire in the case of fibres made of steel.

As FIG. 6 shows, the crown layer 4 may be formed, on its edges, that is to say near the shoulders of the tire, of fibres 40a of a width shorter than that of the fibres 40 that occupy a position closer to the median plane P of the tire.

Further, the external fibres 40a may advantageously be made of a material that is more flexible, and for example of aramid if the more internal fibres 40 are made of steel, this arrangement making it possible to optimize the strength of the tire in terms of its resistance to deformation in the region of the fibres 40a.

The internal fibres 40 of the crown layer 4 illustrated in FIG. 6 may, for their part, be made of respective annular rings, in this instance four of these, or by winding a single tape over a number of turns, in this instance four turns, as illustrated in FIG. 7.

Aside from the fact that it can be produced by implementing a method that is simpler than currently known tires, the tire of the invention is more lightweight and more economic than the latter.

The invention claimed is:

1. A tire comprising an airtight rubber cover and a reinforcing structure essentially formed of a plurality of fibres individually embedded in the rubber and arranged in several layers, wherein:
    the reinforcing structure is formed of a carcass layer, of a crown layer, and of connecting means,
    each fibre of the carcass layer makes a first angle of between 75 and 90 degrees with a median plane perpendicular to the axis of the tire,
    each fibre of the crown layer makes a second angle of between 0 and 15 degrees with the median plane of the tire,
    at least some of the fibres of the carcass layer and at least some of the fibres of the crown layer each have a completely connected cross section of flattened shape with first and second mutually orthogonal dimensions of which the first, or thickness, is less than the second dimension, or width, and runs in a substantially radial direction of the tire,
    said fibres of flattened cross section are made of a material chosen from the group comprising steel, aluminium, glass, a polymer belonging to the family of polyester, polyethylene, polyamide, aramid or polyvinyl alcohol, a composite formed of filaments of glass or of such a polymer embedded in a resin, and a composite of polyethylene filaments coated with resorcinol-formaldehyde-latex,
    the connecting means comprise at least connecting points directly and individually connecting the fibres of flattened cross section belonging to the carcass layer to each fibre of flattened cross section belonging to the crown layer, the carcass layer and the crown layer thus together forming a grid structure,
    the fibres of flattened cross section belonging to the carcass and crown layers are made of a composite formed of filaments embedded in a primary and secondary resin, and
    the connecting points are created by connecting the secondary resin of the fibres of the carcass layer with the secondary resin of the fibres of the crown layer.

2. The tire according to claim 1, wherein the crown layer comprises a single filament fibre shaped as an annular band and occupying at least most of the width of the crown layer.

3. The tire according to claim 1, wherein the carcass layer and the crown layer each comprise a plurality of single filament fibres.

4. The tire according to claim 3, wherein at least some of said single filament fibres of flattened cross section are each formed of a plurality of substantially mutually parallel filaments embedded in a matrix that gives this single filament fibre its airtightness and cohesion.

5. The tire according to claim 3, wherein said single filament fibres of flattened cross section are each made of a material that has a tensile modulus of between 3 GPa and 250 GPa, each single filament fibre of the crown layer having a tensile modulus of at least 30 GPa.

6. The tire according to claim 1, wherein at least some of said single filament fibres of flattened cross section are each formed of a plurality of substantially mutually parallel filaments embedded in a matrix that gives this single filament fibre its airtightness and cohesion.

7. The tire according to claim 1, wherein said single filament fibres of flattened cross section are each made of a material that has a tensile modulus of between 3 GPa and 250 GPa, each single filament fibre of the crown layer having a tensile modulus of at least 30 GPa.

8. The tire according to claim 3, wherein the crown layer is formed of a circumferential winding of a tape, the various turns of which comprise the various single filament fibres of this layer.

9. The tire according to claim 3, wherein each of the single filament fibres of the carcass layer is folded round and held at its two ends on respective circular bead wires that reinforce the respective internal beads of the tire.

10. The tire according to claim 3, wherein the single filament fibres have, in cross section, a width and a thickness having a ratio that is equal to at least five.

11. The tire according to claim 1, wherein the crown layer is formed of a circumferential winding of a tape, the various turns of which constitute the various single filament fibres of this layer.

12. The tire according to claim 1, wherein each of the single filament fibres of the carcass layer is folded round and held at its two ends on respective circular bead wires that reinforce the respective internal beads of the tire.

13. The tire according to claim 1, wherein the crown layer extends around the carcass layer.

14. The tire according to claim 1, wherein the crown layer extends in a restricted zone substantially parallel to the tread.

15. The tire according to claim 1, wherein the single filament fibres have, in cross section, a width and a thickness of which the ratio is equal to at least five.

16. A tire comprising:
an airtight rubber cover; and
a reinforcing structure essentially formed of a plurality of fibres individually embedded in the rubber and arranged in several layers, wherein:
the reinforcing structure is formed of a carcass layer, of a crown layer and of connecting means,
each fibre of the carcass layer makes a first angle of between 75 and 90 degrees with a median plane perpendicular to the axis of the tire,
each fibre of the crown layer makes a second angle of between 0 and 15 degrees with the median plane of the tire,
the connecting means join together the fibres of the carcass layer and of the crown layer,
at least some of the fibres of the carcass layer and at least some of the fibres of the crown layer each have a completely connected cross section of flattened shape with first and second mutually orthogonal dimensions of which the first, or thickness, is less than the second dimension, or width, and runs in a substantially radial direction of the tire,
said fibres of flattened cross section are made of a material chosen from the group comprising steel, aluminium, glass, a polymer belonging to the family of polyester, polyethylene, polyamide, aramid or polyvinyl alcohol, a composite formed of filaments of glass or of such a polymer embedded in a resin, and a composite of polyethylene filaments coated with resorcinol-formaldehyde-latex,
the connecting means comprise at least connecting points directly and individually connecting the fibres of flattened cross section belonging to the carcass layer to each fibre of flattened cross section belonging to the crown layer, the carcass layer and the crown layer thus together forming a grid structure,
the fibres of flattened cross section belonging to the carcass and crown layers are made of a composite formed of filaments embedded in a primary and secondary resin, and
the connecting points are created by connecting the secondary resin of the fibres of the carcass layer with the secondary resin of the fibres of the crown layer.

17. The tire according to claim 16, wherein the crown layer comprises a single filament fibre shaped as an annular band that occupies at least most of the width of the crown layer.

18. The tire according to claim 16, wherein the carcass layer and the crown layer each comprise a plurality of single filament fibres.

19. The tire according to claim 18, wherein at least some of said single filament fibres of flattened cross section are each formed of a plurality of substantially mutually parallel filaments embedded in a matrix that gives this single filament fibre its airtightness and cohesion.

20. The tire according of claim 18, wherein:
said single filament fibres of flattened cross section each comprise a material that has a tensile modulus of between 3 GPa and 250 GPa, and
each single filament fibre of the crown layer having a tensile modulus of at least 30 GPa.

21. The tire according to claim 16, wherein at least some of said single filament fibres of flattened cross section are each formed of a plurality of substantially mutually parallel filaments embedded in a matrix that gives this single filament fibre its airtightness and cohesion.

22. The tire according to claim 16, wherein said single filament fibres of flattened cross section are each made of a material that has a tensile modulus of between 3 GPa and 250 GPa, each single filament fibre of the crown layer having a tensile modulus of at least 30 GPa.

23. The tire according to claim 18, wherein each of the single filament fibres of the carcass layer is folded round and held at its two ends on respective circular bead wires that reinforce the respective internal beads of the tire.

24. The tire according to claim 18, wherein the single filament fibres have, in cross section, a width and a thickness of which the ration is equal to at least five.

25. The tire according to claim 16, wherein the material which the connecting layer is comprised of has a secant tensile modulus at 10% deformation of at least 50 MPa.

26. The tire according to claim 16, wherein the connecting layer comprises polyester, an epoxy resin, or a material that has a secant tensile modulus at 10% deformation equal to at least the tensile modulus of polyester or of epoxy resin.

27. The tire according to claim 16, wherein the material which the connecting layer is comprised of has a secant tensile modulus at 10% deformation at most equal to 300 MPa.

28. The tire according to claim 16, wherein the crown layer extends around the carcass layer.

29. The tire according to claim 16, wherein the crown layer extends in a restricted zone substantially parallel to the tread.

30. The tire according to claim 16, wherein the single filament fibres have, in cross section, a width and a thickness of which the ratio is equal to at least five.

* * * * *